(12) United States Patent
McGinnis et al.

(10) Patent No.: US 9,186,627 B2
(45) Date of Patent: *Nov. 17, 2015

(54) THIN FILM COMPOSITE HEAT EXCHANGERS

(75) Inventors: Robert L. McGinnis, Coventry, CT (US); Gary McGurgan, St. Louis Park, MN (US)

(73) Assignee: OASYS WATER, INC., Boston, MA (US)

( * ) Notice: Subject to any disclaimer, the term of this patent is extended or adjusted under 35 U.S.C. 154(b) by 1066 days.

This patent is subject to a terminal disclaimer.

(21) Appl. No.: 13/251,945

(22) Filed: Oct. 3, 2011

(65) Prior Publication Data

US 2012/0073795 A1    Mar. 29, 2012

Related U.S. Application Data (63) Continuation-in-part of application No. 12/862,584, filed on Aug. 24, 2010, now Pat. No. 8,181,794.

(60) Provisional application No. 61/389,536, filed on Oct. 4, 2010, provisional application No. 61/291,430, filed on Dec. 31, 2009, provisional application No. 61/253,786, filed on Oct. 21, 2009, provisional application No. 61/236,441, filed on Aug. 24, 2009.

(51) Int. Cl.
*B01D 71/56* (2006.01)
*B01D 69/10* (2006.01)
*B05D 3/12* (2006.01)
(Continued)

(52) U.S. Cl.
CPC .......... *B01D 61/002* (2013.01); *B01D 67/0009* (2013.01); *B01D 69/105* (2013.01); *B01D 69/12* (2013.01); *B01D 71/54* (2013.01); *B01D 71/56* (2013.01); *B01D 71/80* (2013.01); *F28D 7/16* (2013.01); *F28D 9/005* (2013.01); *F28F 21/062* (2013.01); *F28F 21/065* (2013.01); *B01D 2323/42* (2013.01); *Y10T 29/4935* (2015.01)

(58) Field of Classification Search
None
See application file for complete search history.

(56) References Cited

U.S. PATENT DOCUMENTS 3,161,574 A    12/1964   Elam
3,228,456 A    1/1966    Brown et al.
(Continued)

FOREIGN PATENT DOCUMENTS

CN    1662786 A    8/2005
EP    1044719 A1   10/2000
(Continued)

OTHER PUBLICATIONS

Achilli et al. "The Forward Osmosis Membrane Bioreactor: A Low Fouling Alternative to MBR Processes". Desalination 239 (2009) 10-21.
(Continued)

*Primary Examiner* — Krishnan S Menon
(74) *Attorney, Agent, or Firm* — Lando & Anastasi, LLP (57) ABSTRACT

The invention generally relates to thin film composite heat exchangers and methods of making thin film composite heat exchangers. The heat exchangers can be made with polymers or other materials including, but not limited to, inorganic materials such as silicon, clay, ceramic, brick, or metal. Heat exchangers in accordance with the invention may be made of a material that is non-corrosive, durable, and that may be applied in a thin coating so as to minimize resistance to heat transfer and material costs.

12 Claims, 3 Drawing Sheets

(51) Int. Cl.
- *F28F 21/06* (2006.01)
- *F28D 7/16* (2006.01)
- *B01D 61/00* (2006.01)
- *B01D 67/00* (2006.01)
- *B01D 69/12* (2006.01)
- *B01D 71/54* (2006.01)
- *B01D 71/80* (2006.01)
- *F28D 9/00* (2006.01)

(56) References Cited

U.S. PATENT DOCUMENTS

| | | | |
|---|---|---|---|
| 3,277,959 A | | 10/1966 | Withers |
| 3,537,935 A | | 11/1970 | Withers |
| 3,686,116 A | | 8/1972 | Rio |
| 3,709,841 A | | 1/1973 | Quentin |
| 4,026,977 A | | 5/1977 | Bourganel |
| 4,174,987 A | | 11/1979 | Belvin et al. |
| 4,216,820 A | | 8/1980 | Andrew |
| 4,277,299 A | | 7/1981 | Cherenko et al. |
| 4,411,310 A | | 10/1983 | Perry et al. |
| 4,476,024 A | | 10/1984 | Cheng |
| 4,545,862 A | | 10/1985 | Gore et al. |
| 4,585,523 A | | 4/1986 | Giddings |
| 4,629,563 A | | 12/1986 | Wrasidlo |
| 4,670,146 A | | 6/1987 | Inoue et al. |
| 4,728,394 A | | 3/1988 | Shinjou et al. |
| 4,767,544 A | | 8/1988 | Hamblin |
| 4,795,559 A | | 1/1989 | Shinjou et al. |
| 4,842,049 A | | 6/1989 | Dodds |
| 5,160,046 A | | 11/1992 | Pasternak |
| 5,171,445 A | | 12/1992 | Zepf |
| 5,286,280 A | | 2/1994 | Chiou |
| 5,498,278 A | | 3/1996 | Edlund |
| 5,645,626 A | | 7/1997 | Edlund et al. |
| 5,702,503 A | | 12/1997 | Tse Tang |
| 5,869,174 A | | 2/1999 | Wang |
| 6,131,649 A | | 10/2000 | Pearl et al. |
| 6,165,363 A | | 12/2000 | Oishi et al. |
| 6,207,053 B1 * | 3/2001 | Carroll et al. ............ 210/500.23 |
| 6,409,921 B1 | | 6/2002 | Muller et al. |
| 6,423,205 B1 | | 7/2002 | Akahori et al. |
| 6,486,240 B1 | | 11/2002 | Won et al. |
| 6,495,043 B1 | | 12/2002 | Heijnen |
| 6,547,000 B1 | | 4/2003 | Rantala et al. |
| 6,673,242 B1 | | 1/2004 | Herron |
| 6,753,055 B2 | | 6/2004 | Stevens et al. |
| 6,902,672 B2 | | 6/2005 | Herron |
| 7,152,670 B2 | | 12/2006 | Dobbs et al. |
| 7,445,712 B2 | | 11/2008 | Herron |
| 7,566,402 B2 | | 7/2009 | Thorsen et al. |
| 7,591,933 B2 | | 9/2009 | Grebenyuk et al. |
| 8,181,794 B2 * | 5/2012 | McGinnis et al. ........ 210/500.38 |
| 2002/0056535 A1 | | 5/2002 | Hama et al. |
| 2005/0006301 A1 | | 1/2005 | Angelini et al. |
| 2005/0011359 A1 | | 1/2005 | Pan et al. |
| 2005/0077243 A1 | | 4/2005 | Pinnau et al. |
| 2006/0043013 A1 | | 3/2006 | Hiro et al. |
| 2006/0226067 A1 | | 10/2006 | Herron |
| 2007/0251883 A1 | | 11/2007 | Niu |
| 2008/0149561 A1 | | 6/2008 | Chu et al. |
| 2008/0312349 A1 | | 12/2008 | Yeager et al. |
| 2009/0049794 A1 | | 2/2009 | Barone et al. |
| 2009/0078640 A1 | | 3/2009 | Chu et al. |
| 2010/0285101 A1 | | 11/2010 | Moore et al. |

FOREIGN PATENT DOCUMENTS

| | | |
|---|---|---|
| JP | 2002-504870 A | 2/2002 |
| JP | 2007-045923 A | 2/2007 |
| WO | 97/33681 A1 | 9/1997 |
| WO | 03047733 A1 | 6/2003 |
| WO | 06049663 A1 | 5/2006 |
| WO | 2006049663 A1 | 5/2006 |
| WO | 08137082 A1 | 11/2008 |
| WO | 2008137082 A1 | 11/2008 |
| WO | 11060202 A1 | 5/2011 |
| WO | 2011060202 A1 | 5/2011 |
| WO | 11069050 A1 | 6/2011 |
| WO | 2011069050 A1 | 6/2011 |

OTHER PUBLICATIONS

Bamaga et al. "Hybrid FO/RO Desalination System: Preliminary Assesment of Osmotic Energy Recovery and Designs of New FO Membrane Module Configurations". Desalination 268 (2011) pp. 163-169.

Chou et al. "Characteristics and Potential Applications of a Novel Forward Osmosis Hollow Fiber Membrane". Desalination Journal. © 2010 Elsevier B.V.

Ghosh et al. "Impacts of Support Membrane Structure and Chemistry on Polyamide-Polysulfone Interfacial Composite Membranes". Journal of Membrane Science 336 (2009) pp. 140-148.

Gray et al. "Internal Concentration Polarization in Forward Osmosis: Role of Membrane Orientation". Desalination 197 (2006) pp. 1-8.

Lay et al. "Study of Integration of Forward Osmosis and Biological Process: Membrane Performance Under Elevated Salt Environment". Desalination Journal. © 2011 Elsevier B.V.

Lee et al. "Comparison of Fouling Behavior in Forward Osmosis (FO) and Reverse Osmosis (RO)". Journal of Membrane Science. © 2010 Elsevier B.V.

Loeb et al. "Effect of Porous Support Fabric on Osmosis Through a Loeb-Sourirajan Type Asymmetric Membrane". Journal of Membrane Science 129 (1997) pp. 243-249.

McCutcheon et al. "Influence of Concentrative and Dilutive Internal Concentration Polarization on Flux Behavior in Forward Osmosis". Journal of Membrane Science 284 (2006) pp. 237-247.

McCutcheon et al. "Influence of Membrane Support Layer Hydrophobicity on Water Flux in Osmotically Driven Membrane Processes". Journal of Membrane Science 318 (2008) pp. 458-466.

Mehta et al. "Internal Polarization in the Porous Substructure of a Semipermeable Membrane Under Pressure-Retarded Osmosis". Journal of Membrane Science 4 (1978) pp. 261-265.

Mehta et al. "Performance of Permasep B-9 and B-10 Membranes in Various Osmotic Regions and at High Osmotic Pressures". Journal of Membrane Science 4, (1979) pp. 335-349.

Mehta, Gurmukh. "Further Results on the Performance of Present-Day Osmotic Membranes in Various Osmotic Regions". Journal of Membrane Science 10 (1982) pp. 3-19.

Ng et al. "Performance of Forward (Direct) Osmosis Process: Membrane Structure and Transport Phenomenon". Environ. Sci. Technol. 2006, 40, pp. 2408-2413.

Sairam et al. "Method for the Preparation of Cellulose Acetate Flat Sheet Composite Membranes for Forward Osmosis—Desalination using MgSO4 Draw Solution". Desalination 273 (2011) 299-307. © 2011 Elsevier B.V.

Tang et al. "Concentration of Brine by Forward Osmosis: Performance and Influence of Membrane Structure". Desalination 224 (2008) pp. 143-153.

Tang et al. "Modeling Double-Skinned FO Membranes". Desalination 283 pp. 178-186. © 2011 Elsevier B.V.

Yip et al. "Thin-Film Composite Pressure Retarded Osmosis Membranes for Sustainable Power Generation from Salinity Gradients". Environmental Science & Technology. Apr. 14, 2011.

* cited by examiner

THIN FILM COMPOSITE HEAT EXCHANGERS

CROSS-REFERENCE TO RELATED APPLICATION

This application is a continuation-in-part of U.S. patent application Ser. No. 12/862,584, filed Aug. 24, 2010, the disclosure of which is hereby incorporated herein by reference in its entirety. This application also claims priority to and the benefit of U.S. Provisional Patent Application Nos. 61/389,536, filed Oct. 4, 2010; 61/236,441, filed Aug. 24, 2009; 61/253,786, filed Oct. 21, 2009; and 61/291,430, filed Dec. 31, 2009; the disclosures of which are hereby incorporated by reference herein in their entireties.

FIELD OF THE TECHNOLOGY

Generally, the invention relates to heat exchangers and more particularly to the use of a thin film of heat transfer material on a porous support with a thin and open structure.

BACKGROUND

In general, a heat exchanger is a device that passively transfers heat from one material to another. The materials are typically either liquid or gaseous. The work done by heat exchangers is based on the laws of thermodynamics in that when an object is heated, the heat energy contained within that object will diffuse outward to the surrounding environment until equilibrium has been reached between the object and the environment. Heat exchangers have a wide variety of uses including, but not limited to, space heating, refrigeration, air conditioning, heat transfer in power plants, chemical plants, petrochemical plants, petroleum refineries, natural gas processing, and sewage treatment.

The basic heat exchanger design generally involves two chambers or passageways separated by a barrier. A feed stream with thermal energy to be transferred is passed through one passageway, and a stream that may receive thermal energy is passed through the other. The streams may be in either co- or counter-current flow. Heat diffuses between the two streams by passing through the barrier until the rate of heat transfer is matched by the resistance to such transfer. The type and size of heat exchanger used depends on the type of material used as the barrier and various properties of the material streams introduced including their phase, temperature, density, viscosity, pressures, chemical compositions, and various other characteristics.

The two most common types of heat exchangers are shell and tube heat exchangers, and plate and frame heat exchangers. Other types of heat exchangers include, but are not limited to, adiabatic wheel heat exchangers, plate fin heat exchangers, fluid heat exchangers, waste heat recovery units, dynamic scraped surface heat exchangers, phase-change heat exchangers, direct contact heat exchangers, air coils, and spiral heat exchangers.

A spiral heat exchanger may refer to a helical tube configuration, but more often is a pair of flat surfaces that are coiled to form two channels in a counter-flow arrangement. Spiral heat exchangers are generally associated with efficient use of space and low energy costs. Some applications include, but are not limited to, pasteurization, digester heating, heat recovery, pre-heating, effluent cooling, and sludge treatment.

Shell and tube heat exchangers consist of a series of tubes arranged in bundles and suspended within shells by insertion into spacer plates. They are considered robust because of the strength of their materials, and effective because of their materials' high heat coefficients and the fluid mixing profiles caused by their design. They are typically suited for higher-pressure and higher temperature applications and often used in oil refineries and other large chemical processes. Tubes must be made of a strong, thermally conductive, corrosion-resistant material. High quality tube materials are typically metals, including, but not limited to, copper alloy, stainless steel, carbon steel, non-ferrous copper alloy, Inconel, nickel, Hastelloy, and titanium.

A plate heat exchanger is composed of multiple, thin, slightly separated plates that have large surface areas and fluid flow passages for heat transfer. The plates are usually made of metal. Plate heat exchangers are generally compact and associated with a high overall heat transfer coefficient. Fluids spread out over the plates thus facilitating the transfer of heat and greatly increasing the speed of temperature changes. They are well suited to transfer heat between medium- and low-pressure materials. Large heat exchangers of this type are called plate-and-frame and are often used in heating, ventilation, and air-conditioning applications. Small plate heat exchangers are used in domestic heating and hot water. Very small brazed versions are used in hot-water sections of combination boilers.

SUMMARY

The invention generally relates to thin film composite heat exchangers and methods of making thin film composite heat exchangers. The heat exchangers can be made with polymers or other materials including, but not limited to, inorganic materials such as silicon, clay, ceramic, brick, or metal. In accordance with one or more aspects, a heat exchanger may be made of a material that is non-corrosive, durable, and that may be applied in a thin coating so as to minimize resistance to heat transfer and material costs. In some embodiments, the invention modifies and improves upon the forward osmosis fabrication techniques disclosed in U.S. patent application Ser. No. 12/862,584, from which this application claims priority, by, for example, utilizing different materials in place of the membrane materials (e.g., heat transfer materials having high heat tolerance and transfer characteristics) and incorporating additional materials and means of manufacture for a support structure to produce a structure more similar to a microfiltration membrane as opposed to an ultrafiltration membrane, thereby resulting in a novel thin film composite polymer heat exchanger having unexpected and valuable benefits, such, for example, lower cost, higher performance, and low to no corrosion.

In one aspect, the invention relates to a method of making thin film composite heat exchangers. The method includes the steps of providing a base support structure, such as a fabric or paper, applying a material to the support structure to form a porous support layer, such as a porous polymer made by phase inversion, and then coating that support layer with a heat transfer material, such as polyvinylidene fluoride (PVDF) or polyetherethylketone (PEEK). The heat transfer material can be applied via a known deposition method, for example, vapor deposition, or an inkjet-type printing method. This heat exchange substrate may then be placed into a module of the type used in heat exchanger design, such as plate and frame or shell and tube designs. Glues, elastomeric materials and/or other mechanical means may facilitate fabrication. The selection of the materials used may be informed by various parameters under which the heat exchanger may be intended to operate, including temperatures, pressures, and chemical environments.

In accordance with one or more embodiments, the supporting structure may be asymmetric or symmetric and composed of a polymer in a single unit (for example, polysulfone (PS) only) or as a laminate (for example, PS on polyethylene terephthalate (PET)). In accordance with one or more embodiments, the supporting structure may be ultrafiltration (UF) or microfiltration (MF) with respect to the porous structure of at least one surface. In one embodiment, the heat exchanger may include a modified UF or MF membrane.

In accordance with one or more embodiments, the support structure may be formed by phase inversion of polymers. Electrospun supports may also be used, with or without PET or another similar polymer. Ceramic supports, lithographically created porous supports made of silicon or a similar material, or any other technique to create open, porous supports may be used. In at least some embodiments, the support material is a thermally and chemically resistant material with good strength characteristics.

In accordance with one or more embodiments, techniques relating to thin film composite membrane fabrication may be applied to the design and fabrication of heat exchangers in accordance with the invention. The support may preferably have a low structural parameter (S), measured in μm, as defined in literature relating to membrane technology. The S value will be selected to suit a particular application and in some embodiments an S value of <300 is preferred, more preferably <150, which may be achieved with a MF membrane support structure. Attributes that make the S value lower are greater thinness and porosity, and lower tortuosity, of pore structure of the support. Essentially, the lower the S value, the better the heat and mass transfer through the support structure. At least some embodiments relate to the realization that a low structural parameter that facilitates diffusion of salts in osmotically driven membrane systems will deliver analogous, unexpected benefits to heat transfer applications using a porous support material that will facilitate heat and mass transfer. Such a support can be formed as a flat sheet, a hollow fiber, or any number of other structures as with ceramic monoliths, depending on the material and method used.

In accordance with one or more embodiments that utilize thin film composite membrane fabrication techniques, a method of making a heat exchange panel may include providing a bilayer support structure including at least first and second separable layers, applying a material to a first layer of the support structure to form a support layer, applying a heat transfer material to the support layer to form the heat exchange panel, and releasing the heat exchange panel by separating the first layer of the support structure from the second layer of the support structure.

In embodiments where the support structure includes a bilayer structure, the first layer of the support structure may have a Frazier air permeability of about 50 ft$^3$/ft$^2$/min or greater. The material applied to the first layer of the support structure may be applied in a coating of between about 5 and 20 g/m$^2$. The heat exchange panel may have an overall thickness of less than about 125 microns. In at least one embodiment, the heat transfer material may include a polymer, such as PVDF or PEEK. Generally, the heat transfer material should be chemically and thermally resistant, impermeable, and capable of being applied in a thin layer. In some embodiments, the heat transfer material may also include a polyamide, polypiperazine, or a block co-polymer. The support structure may include one or more of a polymeric paper and a tricot-type mesh material. The support layer may be made from materials, such as, for example, polyacrylonitrile, PS, PET, polypropylene (PP), or combinations thereof. In at least some embodiments, the step of releasing the heat exchange panel by separating the first and second layers of the support structure may include modifying a pore structure in at least a section of the support structure, thereby enhancing the porosity and reducing the tortuosity of the support structure. The method may further include reusing the second layer of the support structure.

In another aspect, the invention relates to a method of making a heat exchange panel. The method includes casting a paperless support structure on a fabrication belt (e.g., a conveyor belt), drum, or similar structure that is used as a substrate replacement that remains primarily within the scope of the manufacturing equipment. The belt may provide support for the deposition of various material layers, but may be retained and reused in the manufacturing equipment rather than being removed at the end of the process to be discarded or reused. The method includes the steps of depositing support material on the paperless support structure, depositing a heat transfer material on the support material, and delaminating the paperless support structure from the fabrication belt to form the heat exchange panel. In some embodiments, the paperless support structure and support layer may be delaminated prior to depositing the heat transfer material, which may be applied in a separate process. In some embodiments, the belt or drum may be constructed and arranged to provide a surface that retains a portion of the support structure. Any retained support structure may be removed prior to full rotation of the belt or drum to prevent accumulation of the material or inhibition of the effectiveness of the deposition and disruption process.

In accordance with one or more embodiments, a heat exchange panel may include a fabric layer of less than about 75 microns, a support layer of less than about 50 microns applied on the fabric layer, and a heat transfer layer applied on the support layer. The heat exchange panel may have an overall thickness of less than about 125 microns.

In some embodiments, the heat transfer layer may include any of the polymers disclosed herein. The support structure may include PET and contain less than about 30 g/m2 of material overall. The supporting material (i.e., support layer) may be applied in a coating of between about 8 and 17.5 g/m2. The combined weight of the support structure, support material, and heat transfer layer overall may be between about 20 and 40 g/m2. The support structure may be made in a wet laid process.

In accordance with one or more embodiments, the top of the porous support layer may be coated with a dense polymer heat transfer layer, the support layer providing a smooth and/or porous surface for receiving the heat transfer material. It may be coated in a thin layer without defects by various techniques including interfacial polymerization, deposition, extrusion and other methods of creating a thin polymer film. Ideally, the coating material is strong, has a high heat conductivity (when deposited in a thin layer), and is thermally and chemically resistant. Polymers that may be useful in this regard include fluorinated polymers such as polytetrafluoroethylene (PTFE) (for example, Teflon®, as available from DuPont), as well as other polymers considered for heat exchange, such as PP, PVDF, PEEK, polyamide (nylon or similar) and PS. In accordance with one or more embodiments, an asymmetric support may be made so that the top most layer is dense.

In accordance with one or more embodiments, a thin polymer film may have very high heat transfer characteristics. In accordance with one or more embodiments, a very thin heat transfer film may be less than about 10 μm thick or even thinner. In at least one embodiment, polyamide films of about 100 nm may be cast upon a PS support layer. The films may be supported in such a way as to give the overall material high strength characteristics. The thickness of the material may also be chosen to resist abrasion over time. Such a heat transfer material may be inexpensive relative to metal heat exchangers, and a relatively large surface area may be packaged into modules and formats suited to the desired heat transfer application. The heat transfer effects in many instances may in fact be superior to conventional heat exchangers, due to the low resistance to heat transfer of a thin film heat exchange material, and to the low resistance to mass transfer of the structural support. In at least some embodiments, formats similar to those used for membranes including plate and frame, hollow fiber and spiral wound configurations may be used.

Furthermore, in some embodiments, the thickness of the heat transfer material will be such that the primary resistance to heat transfer will not be from the material itself, but rather from the heat and mass transfer effects on the surface of the heat transfer material and in the porous support structure of the heat exchange panel. The overall heat transfer coefficient (U) of the heat transfer module may depend on the structural parameter and the phases of the two fluids transferring heat and their associated characteristics.

In one aspect, the invention relates to a method of manufacturing a heat exchange panel. The method includes the steps of providing a support structure having a first layer and a second layer, applying a first material to the first layer of the support structure to form a thin, porous support layer, applying a second material to the first material support layer to form a thin, non-porous heat transfer layer, and releasing the heat exchange panel by releasing the first layer of the support structure from the second layer of the support structure.

In various embodiments, the method includes the step of modifying a pore structure in at least one of the support structure or the support layer. The step of providing a support structure can include providing a microfiltration or ultrafiltration membrane as the support structure. In one or more embodiments, the support structure includes a fabric layer and/or an asymmetric structure. In some embodiments, the support structure has a thickness of about 2 mils to about 4 mils. In one or more embodiments, the first material can have thickness of about 1 mil to about 2 mils and can be applied via phase inversion. In various embodiments, the can include at least one of polysulfone or polyethylene terephthalate. In one or more embodiments, the second material can have a thickness of about 10 µm or less and be applied via a thin film deposition method. In various embodiments, the second material can include at least one of polyvinylidene fluoride, polyetherethylketone, or polytetrafluoroethylene.

In another aspect, the invention relates to a heat exchanger having a plurality of heat exchange panels. The heat exchange panels include a thin support structure having a high porosity and a low tortuosity. The optimal thickness, porosity, and tortuosity will vary to suit a particular application, but in one example, a thickness of 50 microns or less and a tortuosity of 0.5 or less would result in an S of <250 µm. The panels also include a first material disposed on a first side of the support structure to form a thin, porous support layer, and a second material disposed on the support layer to form a thin, non-porous heat transfer layer. In certain embodiments, the support structure and the support layer are configured to promote mass and heat transfer therethough, and the heat transfer layer is configured to promote heat transfer therethough, while preventing mass transfer.

In various embodiments, the heat exchanger includes a housing, where the each of the plurality of heat exchange panels is stacked within the housing to form a plate and frame type heat exchanger. In another embodiment, the heat exchanger includes a cylindrical housing, where each of the plurality of heat exchange panels is spirally wound to form a tubular member and the plurality of tubular members are longitudinally disposed within the cylindrical housing to form a shell and tube type heat exchanger. In some embodiments, the heat exchanger includes a housing having a first inlet and a first outlet for directing a first liquid stream through the heat exchanger on a first side of each heat exchange panel and a second inlet and a second outlet for directing a second liquid stream through the heat exchanger on a second side of each heat exchange panel. In one embodiment, the heat exchange panel is oriented so that the first liquid stream is in direct fluid communication with the porous support structure and the second liquid stream is in direct fluid communication with the heat transfer layer. In additional embodiments, the thin support structure includes a polymeric paper, the first material includes at least one of polysulfone or polyethylene terephthalate, and the second material includes at least one of polyvinylidene fluoride, polyetherethylketone, or polytetrafluoroethylene. In one or more embodiments, the thin support structure can be a bilayer substrate, where in one embodiment, the bilayer substrate has a removable backing layer.

In another aspect, the invention relates to a method of manufacturing a heat exchanger. The method includes the steps of providing a housing defining an interior region and having a first inlet, a first outlet, a second inlet, and a second outlet; forming a plurality of heat exchange panels having a first side and a second side; disposing each of the plurality of heat exchange panels within the interior region of the housing; fluidly coupling a first side of each of the plurality of heat exchange panels to the first inlet and the first outlet of the housing; and fluidly coupling a second side of each of the plurality of heat exchange panels to the second inlet and the second outlet of the housing. The heat exchange panels include a thin support structure having a high porosity and a low tortuosity, a first material disposed on a first side of the support structure and forming a thin, porous support layer, and a second material disposed on the support layer and forming a thin, non-porous heat transfer layer. The heat exchange panels can be made of the various materials disclosed herein and can be formed, for example, spirally wound, to accommodate a particular type of heat exchanger, for example, shell and tube or plate and frame.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention and are not intended as a definition of the limits of the invention. For purposes of clarity, not every component may be labeled in every drawing. In the following description, various embodiments of the present invention are described with reference to the following drawings, in which.

DETAILED DESCRIPTION

Heat exchange panels or substrates in accordance with the invention typically include a porous support structure that provides mechanical and structural support for a heat transfer layer, where the support structure has a very low thickness and tortuosity. Heat exchange panel may be formed in various shapes including spiral wound, tubular and flat sheet depending on an intended application. Heat transfer characteristics should be customized to achieve ideal performance and may vary between specific applications.

Reducing the thickness and tortuosity of the support structure is desirable; however, attempting to reduce the thickness or weight of the support material may be associated with processing problems, such as the inability to run the support material through a fabrication line without creasing or wrinkling. In severe cases, breakage can occur, which may result in significant costs to a manufacturer.

In accordance with one or more embodiments, the manufacture of heat exchange panels with reduced thickness for improved heat transfer properties may be facilitated. In at least some embodiments, the thickness of the support structure may be reduced. Thinner support structures may be associated with reduced cost and enhanced heat and mass transfer through the support layer.

Figure 1:
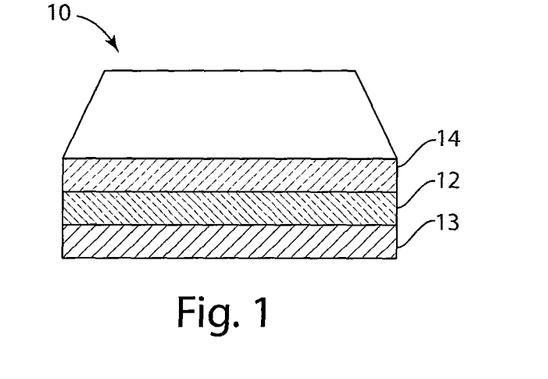
FIG. 1 is a perspective view of a heat exchange panel in accordance with one or more embodiments of the invention.

FIG. 1 depicts one example of a heat exchange panel or substrate 10 manufactured in accordance with one or more embodiments of the invention. As shown, the heat exchange panel 10 includes a heat transfer layer 14 disposed on a support layer 12, which in turn is disposed on a support substrate or structure 13. The heat transfer layer 14 is typically a non-porous, thin film disposed on the support layer 12, where the support layer is typically a highly porous support structure having a very low thickness and tortuosity. The support structure 13 also has a low thickness and a tortuosity. Typically, the support layer 12 is significantly thinner than the support structure 13, since in some embodiments its primary purpose is to provide a smooth interface surface between the highly porous support structure 13 and the heat transfer layer 14. The support structure 13 can be manufactured in accordance with any of the manners described herein, including, for example, with a bilayer fabrication technique. The overall thickness of the heat exchange panel 10 is reduced by reducing the thickness of the support structure 13, which provides the mechanical and structural support to the heat exchange panel 10. In some embodiments, the support structure 13 is approximately four mils thick with a basis weight of 80 g/m² and a Frazier air permeability of about four ft³/ft²/min. Generally, the heat exchange panel 10 can be used in various types of heat exchangers, for example, a plurality of panels can be assembled as a plate and frame assembly or spirally wound, as described herein.

In accordance with one or more embodiments, a bilayer substrate may be provided to facilitate heat exchange panel fabrication. A bilayer substrate may include a top structural support layer which will serve as the structural support for a final heat exchange panel. The structural support layer of the bilayer substrate may be of reduced thickness compared to conventional support layers while at the same time providing an overall thickness required for manufacturing, including the application and processing of a heat transfer layer upon the structural support layer of the bilayer substrate and, in some embodiments, an optional support/interface layer between the heat transfer layer and the bilayer substrate. In some embodiments, the bilayer substrate may include a removable backing layer in addition to the structural support layer to provide the extra thickness. In some embodiments, the backing layer may be largely sacrificial, temporarily providing increased thickness to the structural support layer to facilitate the manufacturing process. The removable backing layer may be intended to be separated from the structural support layer subsequent to heat exchange panel fabrication. In other embodiments, the bilayer substrate may include a backing layer intended to remain intact subsequent to heat exchange panel fabrication. In at least some embodiments, the backing layer may remain connected to the structural support layer and incorporated into a heat exchanger.

The top support layer of the bilayer substrate may generally be a light basis weight layer of reduced thickness in comparison to, for example, a conventional membrane support layer. In at least one embodiment, the top support layer may be PET. In some embodiments, the top support layer and the backing layer may be made of the same material. In other embodiments, they may be made of different materials. The bilayer substrate may be characterized by properties that allow the two layers together to perform similar to an existing standard PET support layer with respect to strength, resistance to creasing, and general processing in a membrane manufacturing process.

Figure 1A:
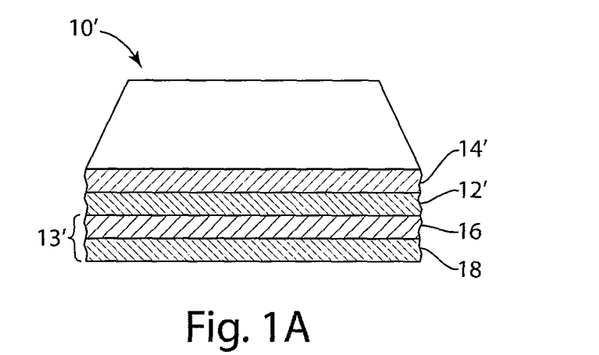
FIG. 1A is a perspective view of an alternative heat exchange panel in accordance with one or more embodiments of the invention.

FIG. 1A depicts a heat exchange panel 10' that utilizes a support structure 13 in the form of a bilayer substrate. The bilayer support structure 13 includes a top support layer 16 that will serve as the structural support for the final heat exchange panel 10 and a removable backing layer 18 that provides additional thickness/support as may be required for manufacturing the heat exchange panel 10, for example, the application and processing of a support layer 12' and a heat transfer layer 14' upon the support layer 16. In some embodiments, the heat exchange panel 10' may not include the support layer 12' (depending on the nature of the top support layer 16); however, if included, it may provide additional support to the heat exchange panel 10', in addition to providing an interface between the support structure 13 and the heat transfer layer 14'. The removable backing layer 18 may be separated from the top support layer 16 subsequent to manufacturing the heat exchange panel 10. In that case, the backing layer 18 is largely sacrificial, temporarily providing increased thickness to the support layer 16 during manufacture of the heat exchange panel 10. In other embodiments, the backing layer 18 may remain connected to the support layer 16 subsequent to manufacturing of the heat exchange panel 10 and incorporated into a heat exchanger formed from one or more heat exchange panels 10.

In some embodiments, the backing layer 18 may typically be about two to about four mils in thickness with a Frazier air permeability of less than about 6 ft³/ft²/min. The support layer 16 may typically be less than about 2 mils in thickness with a Frazier air permeability of greater than about 100 ft³/ft²/min. The heat exchange panel 10' may have an overall thickness of less than about 125 microns. The support layer may contain less than about 30 g/m² of material overall. The supporting material layer 12' may be about 1-2 mils in thickness and applied in a coating of between about 8 and about 17.5 g/m². As previously discussed, the heat transfer layer may be about 10 µm thick or less. The combined weight of the support structure 13, support material 12', and heat transfer layer 14' overall may be between about 20 and about 40 g/m². The support layer 16 may be made in a wet laid process, dry laid process, or a woven material. Alternatively, the support layer 16 may be made by deposition in the presence of an electrical field, such as in an electro-spinning method. Materials may include PET or other polymers typically used in the fabrication of pressure driven membrane supports, and may additionally be designed to have a hydrophilic nature. In some embodiments, the support layer 16 may be a paper, such as a polymeric paper. In some non-limiting embodiments, the support layer 16 may be made of PET, PP, PS, polyacrylonitrile (PAN), or other porous polymers suitable for creating a support for interfacial polymerization of the support layer 12' and the heat transfer layer 14'.

The heat transfer layer 14' and/or the support layer 12' may be applied to the support layer 16 of the bilayer support structure 13 during a manufacturing process similar to membrane manufacturing. The heat transfer layer 14' may include a polymer as previously discussed. Multi-layered substrates in accordance with one or more embodiments may be easier to coat than a single layer, since the support structure 13 is sturdier and thicker and thereby less subject to wrinkling and tearing. Subsequent to processing, the backing layer 18 may then be separated and removed. By using the bilayer support structure 13, a heat exchange panel 10' with a structural support layer of reduced thickness may be produced using standard manufacturing equipment and techniques. In some embodiments, the separation step may be performed prior to application of the heat transfer layer 14'. Additional manufacturing techniques are described below.

In accordance with one or more embodiments, the disclosed methods of manufacture may be characterized by minimal penetration of the support material (layer 16), such as PS, into the backing layer 18, which may facilitate separation and removal of the backing layer 18. Without wishing to be limited to any particular theory, the use of multiple layers may mitigate the impact of strike-through by blocking excess material from penetrating the backing layer 18. As such, the backing layer 18 may remain largely intact subsequent to separation, enabling reuse or recycling of the backing layer 18, which may offer additional efficiencies and cost savings. In other embodiments, the backing layer 18 may be largely sacrificial. In other embodiments, the backing layer 18 may be recycled within the fabrication equipment itself, such as with a rotating belt or drum. In some embodiments, the backing layer or belt may allow sufficient penetration of the support material (layer 16) so that upon removal of the backing material, beneficial disruption of the pore structure of the structural support layer 16 occurs. This may cause the base of the porous support layer 16 to have a more open and porous structure than it would have had without this disruption. Optimal backing layer characteristics may allow for slight penetration of the porous support material, without allowing complete penetration, or "strike through," such that when the backing layer is removed, the pore structure is opened up without causing defects in the heat transfer layer above it.

In at least some embodiments, a bilayer substrate may be formed by casting a support polymer on a substantially high release material such that after casting a heat transfer layer on the support polymer, the support polymer may be peeled from the base material such that only the support layer and the heat transfer layer remain. In other embodiments, a bilayer material may be commercially purchased for use in a heat exchange panel manufacturing process.

As previously discussed, the removal of a sacrificial or recyclable backing layer may create a more open pore structure at a base region of the polymer support layer that previously interfaced with the backing layer prior to removal thereof. This may result in enhanced heat and mass transfer through the finished heat exchange panel. The tearing or other disruption of a relatively closed pore structure at the bottommost section of the porous polymer support may produce a structure characterized by significantly enhancing the porosity and reducing the tortuosity of the support structure. In many cases, the pore structure of such a polymeric support will be substantially open through most of its thickness, but become closed at the point where the polymer phase interacted with the base material. If some of the porous support penetrates into the base layer, removing this layer may expose a much more open structure as would be found throughout the porous layer, removing the tight layer at the base.

In accordance with one or more further embodiments, rather than using a bilayer substrate that includes a sacrificial or otherwise removable backing layer, a bilayer substrate may be implemented that is intended to wholly become part of a resultant heat exchange panel. In these embodiments, a support polymer (e.g., layer 12) may be cast directly onto one or both sides of a tricot-type mesh support material. A polyurethane or other adhesive may be used to bind the support layer to the mesh layer. The support polymer may be PET in certain embodiments. A heat transfer layer may then be applied on either of these support polymer coatings, forming a final heat exchange panel.

In some embodiments, a tricot layer may be laminated to a thin PET layer to create a bilayer substrate that may then be processed on existing manufacturing machines. By combining these layers prior to manufacture, the strength of the tricot can be used to process the thin PET and the resulting bilayer material does not require separation in that the heat exchange panel including tricot may be incorporated directly into a heat exchanger. Without wishing to be bound to any particular theory, the tricot backing may increase heat exchange panel production efficiency since it is relatively impervious to web breakage and has superior strength compared to the standard 4 millimeter PET. This may result in reduced creasing and wrinkling in the manufacturing process and increasing yields.

In accordance with one or more embodiments, a bilayer substrate may be prewetted to improve mass transfer characteristics of the support polymer and polymer/fabric interface. A solvent such as N-methyl-2-pyrrolidone (NMP), dimethyl formamide (DMF), dimethyl sulfoxide (DMSO), triethyl phosphate, dimethyl acetamide, or a combination thereof may be used to prewet. Prewetting may create a more open pore structure, cause less occlusion of pores in the polymer support, enhance polymer porosity by encouraging macro-void formation, improve pore structure, and decrease tortuosity. These properties may be realized and even enhanced by separation of a removable backing layer if used. These properties may be particularly desirable when using bilayer assemblies that are not intended to be separated, such as with supporting tricot mesh and PET fabric, for example, by preventing excessive penetration of the polymer into the supporting material.

In accordance with one or more embodiments, a process to manufacture a heat exchange panel may include the use of a drive system to transport a bilayer sheet of support material, for example two layers of PET paper, through a casting machine that may deposit a polymer in a solvent solution creating a support layer (for example, support layer 12' in FIG. 1A) and/or a heat transfer layer (for example, heat transfer layer 14 in FIG. 1). In some embodiments, the support layer 12' and the heat exchange layer 14' are applied sequentially in a single continuous process. Alternatively, the support layer 12' and the heat transfer layer 14' can be applied in separate processes/machines. Tensions may generally be maintained so as to reduce the possibility of creasing and wrinkling. The bilayer support material may be composed of two layers pressed together such that the bottom layer may be subsequently removed.

The bilayer substrate may be conveyed to a polymer application device which applies a solution of polymer, for example PS, in a solvent, for example DMF. Upon coating, the bilayer substrate may enter a quenching bath in which the polymer precipitates into the top layer of the bilayer substrate. The temperature of the quenching bath may vary and may impact one or more properties of a resultant heat exchange panel. In at least some embodiments, improved properties of heat exchange panels may be associated with quenching bath temperature in the range of 100° F. to 110° F. The top layer of the bilayer substrate is designed to allow sufficient penetration of the solution to result in delamination pressures at which the precipitated polymer layer would disengage from the top layer of the bilayer substrate in excess of about ten psig. In contrast, the backing layer of the bilayer substrate is designed to prevent polymer penetration to allow for the two support material layers to be separated after manufacturing. The primary purpose of the backing layer is to prevent creasing and wrinkling of the top layer while processing by providing necessary strength to allow existing machines (for example, membrane manufacturing machines) to convey the very thin support layer 12 and the very thin heat transfer layer 14 required for heat exchange panels 10. The remainder of the production is completed using standard rinsing and casting equipment.

In accordance with one or more embodiments, the heat transfer layer 14 may be characterized by a thickness adequate to impart the desired heat transfer properties while generally minimizing overall heat exchange panel thickness. In certain embodiments, the heat transfer layer may have an average thickness from about 50 nm and about 200 nm. The thickness of the heat transfer layer is desired to be as limited as possible, but also thick enough to prevent defects in the coating surface. The heat transfer layer may be formed on the surface of a porous support via polymerization, for example, via interfacial polymerization.

In accordance with one or more embodiments, the support layer 12 or 16 may be characterized by a thickness adequate to provide support and structural stability during manufacture and use while generally minimizing overall heat exchange panel thickness. In certain embodiments, the support layer may have an average thickness from about 10 µm to about 75 µm. It is generally desirable for the support layer to be as thin as possible without compromising the quality of the support surface for interfacial polymerization of the heat transfer layer 14. The smoother the support layer is, the lesser thickness of support material is generally required for this criterion. In at least some embodiments, this layer is less than approximately 40 µm.

Polymers that may be suitable for use as porous supports in accordance with one or more embodiments include PS, polyethersulfone (PES), PES-ketone, PEEK, poly(phthalazinone ether sulfone ketone), PAN, PP, polyvinyl fluoride (PVF), polyetherimide (PEI), cellulose acetate, cellulose diacetate, and cellulose triacetate polyacrylonitrile.

In accordance with one or more embodiments, a thin-film composite heat exchange panel may include a porous support comprising a first side with a first plurality of pores, and a second side with a second plurality of pores, wherein the average diameter of substantially all of the first plurality of pores is between about 50 nm and about 500 nm, and the average diameter of substantially all of the second plurality of pores is between about 5 µm and about 50 µm; however, larger pore diameters are contemplated and considered within the scope of the invention. In certain embodiments, the first plurality of pores and the second plurality of pores are in fluid communication. The purpose of the top layer (e.g., structural support layer 16) is to allow for a high quality support layer (e.g., layer 12) to form by interfacial polymerization or other deposition method, and to provide mechanical support to a very thin heat transfer layer (e.g., layer 14) disposed thereon by, for example, interfacial polymerization or other deposition method. The purpose of the remainder of the support structure is to be as open and as minimally tortuous as possible, while being as thin as possible. Large pores towards the bottom may facilitate this purpose. In accordance with one or more embodiments, a polymeric additive may be dispersed in the porous support. This addition may add strength or other desirable properties to the support structure. The heat transfer layer may be applied on the first side of the porous support.

In accordance with one or more embodiments, a method of making a heat exchange panel may include providing a support structure including at least a first layer and a second layer, applying a material to a first layer of the support structure to form a support layer, applying a heat transfer material to the support layer to form the heat exchange panel, and releasing the heat exchange panel by separating the first layer of the support structure from the second layer of the support structure.

In accordance with one or more embodiments, a method of making a heat exchange panel may include providing a support structure including at least a thin support layer, adding a material to the support layer to form a support structure, releasing the thin support layer and material structure as one piece, and coating the support structure with a heat transfer material to form the heat exchange panel.

In accordance with one or more embodiments, a heat exchange panel may include a fabric layer of less than about 75 microns, a support layer of less than about 50 microns applied on the fabric layer, and a heat transfer layer applied on the support layer. The heat exchange panel may have an overall thickness of less than about 125 microns. The support layer may contain less than about 30 g/m2 of material overall. In some embodiments, the supporting material may be applied in a coating of between about 5 and 20 g/m2. In some embodiments, the coating may be between about 8 and 17.5 g/m2. The combined weight of the support layer, support material, and heat transfer layer overall may be between 20 and 40 g/m2. The support layer may be made in a wet laid process.

In accordance with one or more embodiments, a polymer or other material may be deposited via various known techniques on a thin woven or non-woven or inorganic substrate to form a heat exchange panel with a very thin support structure. In some embodiments, the substrate used for fabrication may include a multi-layered support. An ultrafiltration (UF) substrate may be placed on a multi-layer woven or non-woven support, such that one or more layers may be removable at the end of a fabrication process prior to heat exchanger construction. In at least some embodiments, the size of the pores of the substrate material may be in the UF range, for example, about 100 nm to about 1 um diameter, to facilitate proper formation of an interfacial polymerization heat transfer layer on its surface. In some embodiments, deposition may include phase inversion of polymers such as PS or PAN. Layers that remain connected to the UF substrate may be optimized for desirable characteristics, for example, high porosity, low tortuosity, thinness or other properties that enhance diffusion to the UF layer for an optional support layer and good heat transfer properties, chemical resistance, and non-porous for the heat transfer layer.

In some embodiments, a heat transfer coated UF material may be placed, such as with phase inversion of a polymer, followed by an interfacial polymerization of a heat transfer layer, on a woven or non-woven support such that after the manufacturing of the heat exchange panel, the support may be removed leaving only the UF and heat transfer material to be used in a heat exchanger. In some non-limiting embodiments, a UF layer may be deposited then coated with a heat transfer layer. In at least one embodiment, the substrate may include an intentionally separable support.

This support structure may be below the polymer, partially enclosed, or fully enclosed within it. In some embodiments, interfacial polymerization or coating of a thin heat transfer layer may then be implemented. In other embodiments, deposition of a porous support layer on a removable material, such as delamination from a belt or other linear, mobile backing material that is used to enhance material handling in the fabrication equipment, but which is not intended to become part of the finished membrane product, may be used to create a very thin support structure, such that it has no backing. A thin heat transfer layer may then be deposited on the surface of the paperless support. In some embodiments, the heat transfer layer may be deposited on the support prior to the delamination of the support from the belt.

The support film may be non-woven and made of any material, but thinness, high porosity, and low tortuosity are generally desirable. The thickness of the support film may vary. In some embodiments, the support film may be less than about 100 micrometers, less than about 80 micrometers, less than about 50 micrometers or even thinner. In at least one embodiment, a porous polyester non-woven support film may be used as a substrate.

In accordance with one or more embodiments, a method of making a heat exchange panel may include providing a thin woven or non-woven fabric backing of less than about 50 micrometers in thickness. A support layer and a heat transfer layer may be applied to the fabric backing. The thin woven or non-woven fabric support layer (top layer) may be characterized by a Frazier air permeability of greater than about 100 $ft^3/ft^2/min$. The thin woven or non-woven fabric backing layer (bottom layer) may be characterized by a Frazier air permeability of less than about 10 $ft^3/ft^2/min$. In some embodiments, a Frazier air permeability of about 5 $ft^3/ft^2/min$ for the bottom backing layer may be desirable. In at least some embodiments, the thin woven or non-woven fabric backing layer may be of less than about 30 $g/m^2$ basis weight. The support layer applied to the fabric backing layer may be less than about 40 micrometers in thickness. The heat transfer layer may be applied to the polymeric support layer.

In accordance with one or more embodiments, a heat exchange panel may be processed on production lines currently used in the manufacture of membranes. In accordance with one or more embodiments the method by which a thin heat exchange panel is processed may include the use of an integrated drive system to control tension in discrete sections of a machine. Supplemental manual or automated web steering devices may also be implemented. In some embodiments, machine design may allow for no more than about a 10% tension drop per zone to reduce over tensioning of the heat exchange panel, which may lead to creasing and folding over of the heat exchange panel. Tensions of less than about 1 pound per linear inch may prevent creasing of the heat exchange panel. The design of the machine may also generally limit the free span of unsupported heat exchange panels to less than one half the web widths in areas in which the heat exchange panel is submersed. In some non-limiting embodiments, machine design may also include optical alignment at a tolerance of about 0.001 inches per linear foot of roller width to prevent creasing and folding over of the heat exchange panel.

Figure 2:
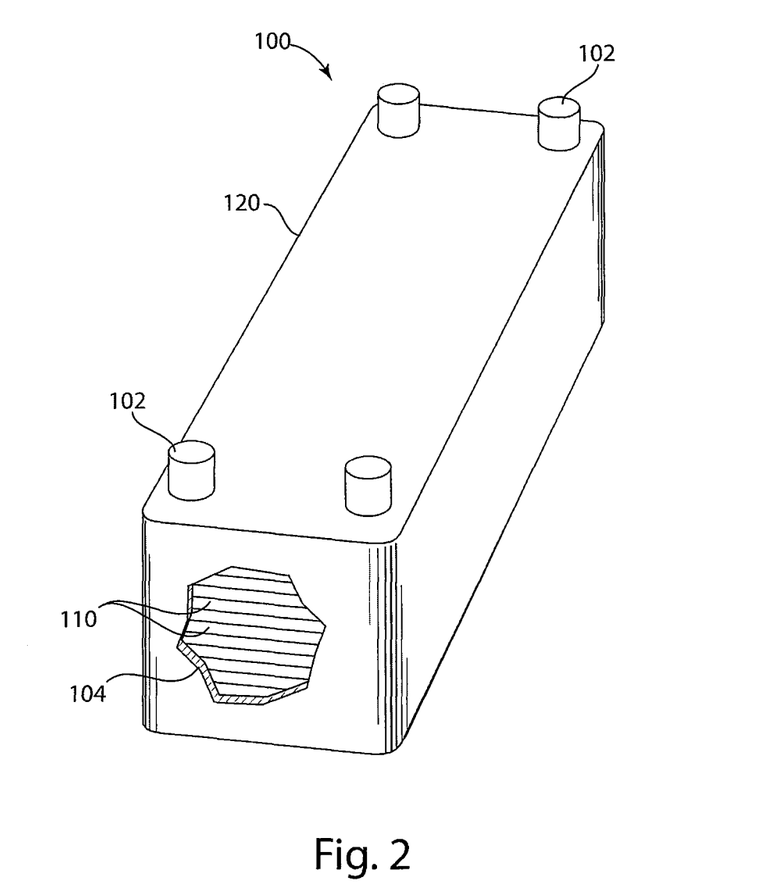
FIG. 2 is a perspective view of a heat exchanger in accordance with one or more embodiments of the invention.
Figure 3:
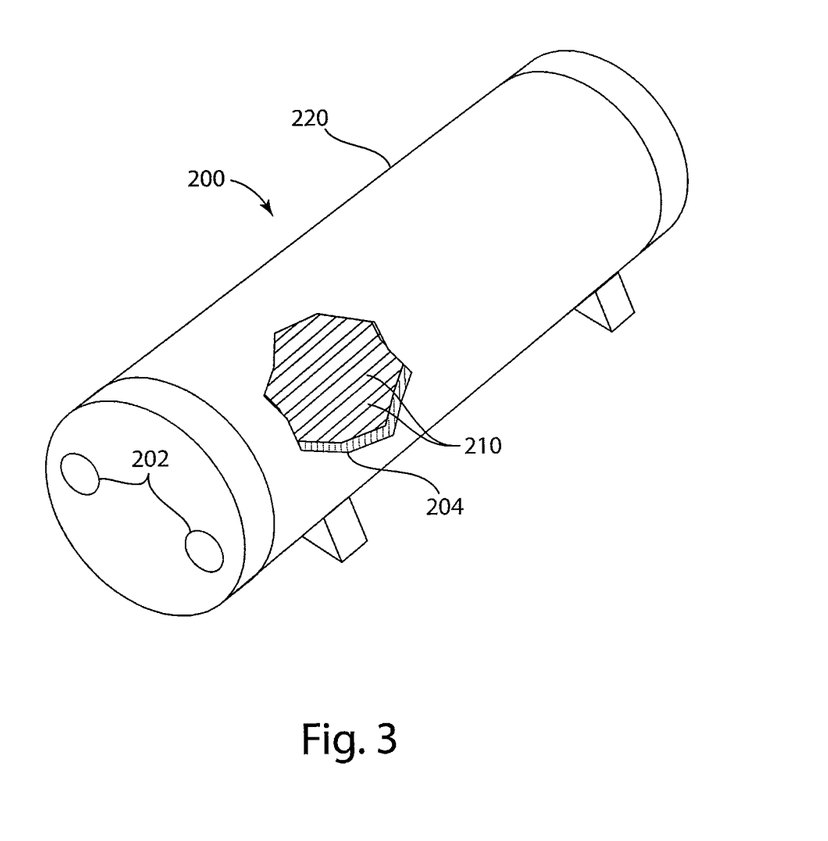
FIG. 3 is a perspective view of another heat exchanger in accordance with one or more embodiments of the invention.

In accordance with one or more embodiments of the invention, the afore-mentioned heat exchange panels 10 may be positioned within an interior region 104, 204 defined by a housing 120, 220, as shown in FIGS. 2 and 3. The housing 120, 220 may generally be sized and shaped to accommodate one or heat exchange panels 10 positioned therein. For example, FIG. 2 depicts a plate and frame type heat exchanger 100, where a plurality of heat exchange panels 110 are stacked and appropriately spaced within the housing 120 as is well-known with conventional plate and frame type heat exchangers. The heat exchanger 100 includes a plurality of ports 102 for introducing to and removing from the heat exchanger 100 two or more fluid streams. FIG. 3 depicts an example of a shell and tube type heat exchanger 200, where a plurality of spirally wound heat exchange panels 210 form the tubes, which are disposed within a cylindrical housing 220. The heat exchanger 200 also includes ports 202 that provide inlets and outlets for the various fluid streams. The construction of the shell and tube type heat exchanger 200 is otherwise consistent with known manufacturing techniques for these types of heat exchangers.

Prophetic Example

In accordance with one or more embodiments, a 0.5 μm thick PEEK film on a low structural parameter support would provide heat transfer through the PEEK film at a rate of 500,000 $W/m^2$-K, substantially higher than that which would occur through a 6 mm stainless steel heat transfer surface, which has a heat transfer coefficient of approx. 67,000 $W/m^2$-K. The overall heat transfer coefficient of heat exchangers of either thin film composites or conventional metal surfaces will be determined by the heat and mass transfer coefficients on each side of the heat exchange material. In some cases, a thin film composite heat exchanger in accordance with one or more embodiments will have similar or superior heat transfer characteristics, but in many cases, it will have significantly greater resistance to corrosion, and significantly lower cost. Additionally, if only one side of the heat exchanger needed high chemical resistance, a very thin film of more expensive material could face that side, while a support structure of a much less expensive material could face the other.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in any claims. Further, acts, elements, and features discussed only in connection with one embodiment are not intended to be excluded from a similar role in other embodiments.

Furthermore, those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of any appended claims and equivalents thereto; the invention may be practiced otherwise than as specifically described.

What is claimed is:

1. A method of manufacturing a heat exchange panel, the method comprising the steps of:
   providing a support structure comprising a bilayer substrate including first and second separable layers;
   applying a first material to the first layer of the bilayer substrate of the support structure to form a thin, porous support layer;
   applying a second material to the first material support layer to form a thin, non-porous heat transfer layer; and
   separating the heat exchange panel by releasing the second layer of the bilayer substrate from the first layer of the bilayer substrate to form the heat exchange panel.

2. The method of claim 1 further comprising modifying a pore structure in at least one of the support structure or the support layer.

3. The method of claim 1, wherein the support structure comprises a fabric layer.

4. The method of claim 1, wherein the support structure comprises an asymmetric structure.

5. The method of claim 1, wherein the support structure is provided with a thickness of about 2 mils to about 4 mils.

6. The method of claim 1, wherein the first material is applied in a thickness of about 1 mil to about 2 mils.

7. The method of claim 1, wherein the first material is applied via phase inversion.

8. The method of claim 1, wherein the first material comprises at least one of polysulfone or polyethylene terephthalate.

9. The method of claim 1, wherein the second material is applied in a thickness of about 10 μm or less.

10. The method of claim 1, wherein the second material is applied via a thin film deposition method.

11. The method of claim 1, wherein the second material comprises at least one of polyvinylidene fluoride, polyetherethylketone, or polytetrafluoroethylene.

12. A method of manufacturing a heat exchanger, the method comprising the steps of:
   providing a housing defining an interior region and having a first inlet, a first outlet, a second inlet, and a second outlet;
   forming a plurality of heat exchange panels having a first side and a second side, wherein the step of forming a panel comprises:
      providing a support structure comprising a bilayer substrate including first and second separable layers;
      applying a first material to the first layer of the bilayer substrate of the support structure to form a thin, porous support layer;
      applying a second material to the first material support layer to form a thin, non-porous heat transfer layer; and
      separating the heat exchange panel by releasing the second layer of the bilayer substrate from the first layer of the bilayer substrate to form the heat exchange panel,
   disposing each of the plurality of heat exchange panels within the interior region of the housing;
   fluidly coupling a first side of each of the plurality of heat exchange panels to the first inlet and the first outlet of the housing; and
   fluidly coupling a second side of each of the plurality of heat exchange panels to the second inlet and the second outlet of the housing.

* * * * *